United States Patent
Ishii et al.

(10) Patent No.: US 6,892,026 B2
(45) Date of Patent: May 10, 2005

(54) ELECTRONIC EQUIPMENT, CAMERA AND CONTROL METHOD THEREOF

(75) Inventors: Hiroyuki Ishii, Yamato (JP); Yoshito Katagiri, Hachioji (JP)

(73) Assignee: Konica Corporation, Tokyo (JP)

( * ) Notice: Subject to any disclaimer, the term of this patent is extended or adjusted under 35 U.S.C. 154(b) by 132 days.

(21) Appl. No.: 10/412,984

(22) Filed: Apr. 14, 2003

(65) Prior Publication Data

US 2003/0199995 A1 Oct. 23, 2003

(30) Foreign Application Priority Data

Apr. 23, 2002 (JP) ........................................ 2002-121342
Jun. 13, 2002 (JP) ........................................ 2002-172468

(51) Int. Cl.[7] ............................................. G03B 17/00
(52) U.S. Cl. .............................. 396/48; 396/55; 396/56; 396/213; 396/263; 348/207.11; 348/207.99; 348/208.1; 348/208.4; 348/220.1; 700/19; 700/20
(58) Field of Search ............................ 700/1, 9, 19, 20, 700/259; 396/56, 55, 48, 47, 213, 263; 348/207.99, 207.11, 208.1, 208.4, 220.1

(56) References Cited

U.S. PATENT DOCUMENTS

| | | | | |
|---|---|---|---|---|
| 5,055,933 A | * | 10/1991 | Hidaka | 348/356 |
| 5,617,039 A | * | 4/1997 | Kuck et al. | 324/771 |
| 5,760,830 A | * | 6/1998 | Kinoshita et al. | 348/220.1 |
| 6,085,717 A | * | 7/2000 | Kamura et al. | 123/295 |
| 6,393,216 B1 | * | 5/2002 | Ootsuka et al. | 396/56 |
| 6,559,963 B1 | * | 5/2003 | Kamimura | 358/1.15 |
| 2002/0034386 A1 | * | 3/2002 | Maruyama et al. | 396/429 |

FOREIGN PATENT DOCUMENTS

| | | | | | |
|---|---|---|---|---|---|
| JP | 08054968 A | * | 2/1996 | | G06F/1/30 |
| JP | 11085915 A | * | 3/1999 | | G06K/13/06 |
| JP | 2000098443 A | * | 4/2000 | | G03B/7/26 |

* cited by examiner

*Primary Examiner*—Ramesh Patel
(74) *Attorney, Agent, or Firm*—Cohen, Pontani, Lieberman & Pavane (57) ABSTRACT

An electronic equipment provided with plural function performing elements for performing various functions, a first control unit, and a second control unit; wherein the first control unit, in order to perform a function specified by an operator, issues an instruction to the second control unit to perform a control operation of at least one of the plurality of function performing elements, and the second control unit performs the control operation in response to the instruction. When the electronic equipment is placed in a specific condition, the second control unit is capable of performing a control operation of a specific function performing element of the plurality of function performing elements, without an instruction from the first control unit.

23 Claims, 3 Drawing Sheets

ELECTRONIC EQUIPMENT, CAMERA AND CONTROL METHOD THEREOF

BACKGROUND OF THE INVENTION

The present invention relates to electronic equipment and camera controlled by a plurality of CPUs, and control method thereof.

PRIOR ART

It has been widely known that electronic equipment such as a camera is provided with a plurality of CPUs as control units, where these CPUs share responsibility for the control, as disclosed in the Japanese Application Patent Laid-Open Publication Nos. Hei 08-054968, Hei 11-085915, and 2000-098443.

In the electronic equipment with two CPUs having different processing speeds, the CPU of high processing speed (hereinafter referred to as "main CPU") is generally responsible for processing of greater loads such as image processing, while the CPU processing of low processing speed (hereinafter referred to as "sub-CPU") is responsible for the processing of smaller loads such as actuator drive processing. In this case, actual drive control of individual actuators is provided by the sub-CPU, and the main CPU supplies the sub-CPU with instructions to control individual actuators, thereby ensuring overall administration of the entire electronic equipment.

In the electronic equipment such as a camera where the user (or operator) is assumed to carry it with him/her, it is also necessary to take the battery life into account. To ensure longer service life of a battery, a big problem is how to minimize power consumption when the equipment is out of service. In this case, when the equipment is not used, the operator turns off the main switch to stop power consumption completely, or selects a low power consumption mode such as a standby mode or sleep mode where the required minimum function is maintained, thereby minimizing the unwanted power consumption.

As described above, in the electronic equipment with two CPUs having different processing speeds, the main CPU of high processing speed generally consumes greater power. It is common practice to turn off power completely to reduce power consumption to zero when the equipment is out of service, or to select a low power consumption mode for supplying only the power just enough to maintain the required minimum functions. In this case, the sub-CPU monitors the on/off state of the main switch. When it has detected that the main switch is turned on, it sends an instruction to the DC/DC converter for turning on and off the power supply to the main CPU so that power is supplied to the main CPU by this converter. Then the main CPU is activated.

Figure 3:
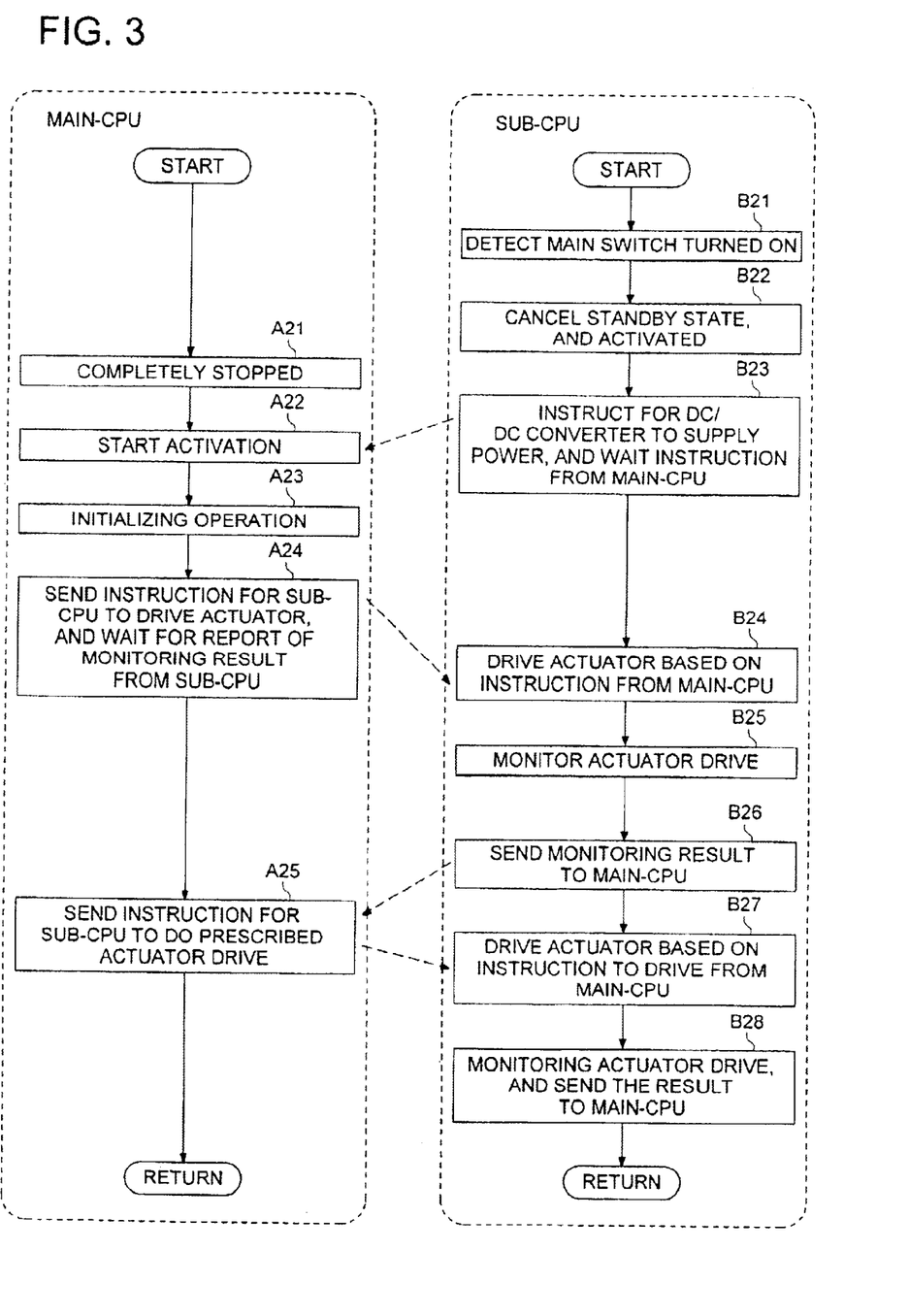
FIG. 3 is a flow chart describing the activation processing carried out when changing from the disable to usable mode in prior art electronic equipment.

Referring now to FIG. 3, the following describes the activation processing performed from the nonuse mode to the usable mode in the aforementioned prior art electronic equipment, using an example of a digital camera. Processing in each of steps A21 through A25 is carried out by the main CPU of high processing speed, and processing in steps B21 through B28 is performed by the sub-CPU whose processing speed is lower than that of the main CPU.

The main switch of the camera is off until the step A21 is reached. At this time, the main CPU is completely stopped and power consumption is completely reduced to zero. Alternatively, the main CPU is placed in the low power consumption mode such as a standby mode or sleep mode for supplying power just enough to maintain the required minimum functions. In other words, the main CPU is disabled in any of these modes, so this state of CUP will hereafter be called the unusable mode.

On the other hand, until step B21 is reached, the sub-CPU may be placed in the usable mode where the amount of power consumption is about the same as that when the camera is used. In this example, the system is in the standby mode or low power consumption mode where power is consumed to monitor whether the main switch has been turned on or not. In this mode, monitoring is performed to check if the main switch has been turned on or not.

When the sub-CPU has recognized that the main switch has turned on (step B21), the standby mode is released and the system is activated to get back to the usable mode (step B21). Further, to start supply of power to the main CPU, the system issues an instruction to the DC/DC converter. Then system is placed in a mode for waiting for an instruction from the main CPU (step B23).

The main CPU starts activation (step A22) when supply of power from the DC/DC converter has started according to step B23, and performs a predetermined initializing operation (step A23). Here the predetermined initializing operation is defined as an initial setting required to start the main CPU operation; it includes boot loading (selection of read-out memory), checking of the presence or absence of the memory card, error check, detection of the capacity and remaining amount, monitoring and initialization of CCD drive circuit in the (standby mode until the circuit is stabilized).

After the termination of the predetermined initializing operation in the main CPU, the main CPU sends an instruction to the sub-CPU to drive a specific actuator (step A24). The expression "To drive the specific actuator," means to drive the actuator in order to pull out the lens barrel collapsed in the collapse position, to open the lens barrier or to pop up the stroboscopic light emitting unit collapsed in the camera proper. Generally, a change in the appearance (outer shape) of a camera notifies the operator that power has turned on.

After having driven a specific actuator based on the instruction from the main CPU in step A24 to drive that specific actuator (step B24), the sub-CPU monitors the operation for an error to see if the specific actuator has been correctly driven or not (Step B25).

The monitored result is sent from the sub-CPU to the main CPU (step B26), and the following control is performed according to the result of this monitoring:

Should an error have occurred to the specific actuator, the main CPU, in order to remove the error, issues an instruction to the sub-CPU that the display unit should display the error (step A25). Having received this instruction, the sub-CPU causes the display unit to indicate the error (step B27), and takes other related measures to solve the problem.

If there is no operation error in the drive of the specified actuator, the camera is enabled to work. Based on the instruction given by the operator pressing the keys, the main CPU instructs the sub-CPU to drive the required actuator (e.g. scaling drive mechanism in the case of scaling operation) (step A25). In response to this drive instruction, the sub-CPU drives the designated actuator (step B27).

In this case, the sub-CPU checks if the actuator to be driven is faulty or not, and sends the result to the main CPU (step B28).

After the above procedure, processing in the step A25 by the main CPU and in the steps B27 and B28 by the sub-CPU is repeated while the camera is kept in the usable mode.

(Problems to be Solved by the Invention)

The prior art electronic equipment such as a conventional camera introduced above has the following problems:

When an operator has turned on the main switch in order to set the unusable mode of electronic equipment to the usable mode, he/she cannot use this electronic equipment from the time when the main switch has been turned on (step B21) to the time when the specified initializing operation terminates in step A23) (for about 4 to 5 sec.). Thus, the operator has to wait for the termination of the initialization. This is a waste of time.

The lens barrel collapsed in the camera body does not come out of the collapsed position before termination of the specified initialization by the main CPU after turning on the main switch. So the operator has no way of knowing if the main switch has been correctly turned on or not (if power is on or not), and may feel uneasy and nervous under stress while waiting for the electronic equipment changing into the usable mode. Sometimes, the camera in the process of activation is operated again, and the power is turned off before the camera is enabled, according to the prior art method.

Thus, the problem to be solved by the present invention is how to find out a way of minimizing the time from the start of activation to selection of the usable mode in the electronic equipment and camera controlled by multiple CPUs and control method thereof, and providing easy-to-use equipment, wherein the start of activation is immediately notified to the operator so that the operator's mental stress can be decreased during the time from start of activation to selection of the usable mode.

SUMMARY OF THE INVENTION

The present invention for solving the aforementioned problem is electronic equipment controlled by the first and second control units comprising:

a start switch for switching between the unusable mode and usable mode of the electronic equipment;

a mode monitor for monitoring the start switch to identify the mode of the electronic equipment, this monitor issuing an activation signal at least when the electronic equipment has been switched from the disable to usable mode, a plurality of function performing elements for performing various functions of the electronic equipment; and a function switch for operating the function performing elements.

This electronic equipment is characterized in that:

(i) when the electronic equipment is placed in the usable mode according to the mode monitor, the first control unit issues an instruction to the second control unit to perform the function associated with this function switch if the function switch has been operated, and the second control unit performs operation control of the function performing elements associated with this function in response to this instruction;

(ii) when the electronic equipment is placed in the unusable mode according to the mode monitor, the first control unit is set to the unusable mode and the second control unit is set to the standby mode with respect to the activation signal; and (iii) when the mode monitor has recognized that the electronic equipment has been switched from the disable to usable mode, the mode monitor issues the activation signal to the second control unit, and the second control unit performs the operation control of specific function performing elements without receiving the instruction from the first control unit.

It is preferred that the second control unit and mode monitor should be controlled by one CPU.

It is also preferred that the first control unit should start initializing operation after having been released.

Further, it is preferred that the initializing operation should be performed in parallel to operation control of the specific function performing elements by the second control unit.

The power consumption of the first control unit is preferred to be greater than that of the second one.

The processing speed of the first control unit is preferred to be higher than that of the second one.

It is also preferred that, when the function switch has been operated, the first control unit, should specify the function performing element for performing the function associated with the function switch, and should instruct the second control unit to control the operation of the specified function performing element.

Another invention for solving the aforementioned problem is electronic equipment comprising a plurality of function performing elements for performing various functions, and first and second control units; wherein the first control unit, in order to perform the function specified by the operator, instructs the second control unit to control the operation of at least one of the function performing elements, whereas the second control unit controls the operation of the function performing element in response to this instruction. This electronic equipment is further characterized in that, when the electronic equipment is placed in a specific condition, the second control unit is capable of controlling the operation of a specific function performing element, without instruction from the first control unit.

It is further preferred that the aforementioned specific condition should be the same as the condition during the time from the start of a specified initializing operation by the first control unit to the termination of the predetermined setting operation.

It is also preferred that the electronic equipment should be a camera.

A further invention for solving the aforementioned problem is a camera comprising a plurality of function performing elements for performing various functions, and first and second control units; wherein the first control unit, in order to perform the function specified by the operator, instructs the second control unit to control the operation of at least one of the function performing elements, whereas the second control unit controls the operation of the function performing element in response to this instruction. This camera is further characterized in that, when the camera start switch has been changed from the disable to usable mode, the first control unit performs initializing operation, whereas the second control unit controls the operation of at least one of the function performing elements that changes the appearance of the camera, without any instruction from the first control unit.

The aforementioned control of the operation of the function performing element that changes the appearance of the camera is preferred to be control of the lens barrel coming out of the collapsed position.

The aforementioned control of the operation of the function performing element that changes the appearance of the camera is preferred to be control of a stroboscope coming out of the collapsed position.

Still another present invention for solving the aforementioned problem is a control method for the electronic equipment comprising a plurality of functions performing elements for performing various functions, and first and second control units; wherein, if the electronic equipment is placed in the usable mode, the first control unit, in order to perform the function specified by the operator, instructs the second control unit to control the operation of at least one of the function performing elements, whereas the second control unit controls the operation of the function performing element in response to this instruction. This control method is further characterized in that, when the electronic equipment has been switched from the unusable to usable mode, the second control unit is capable of controlling the operation of a specific function performing element after the unusable mode of the first control unit has been reset, without receiving instruction from the first control unit.

It is preferred that initializing operation of the first control unit should be performed in parallel with control of the operation of the aforementioned specified function performing element.

A still further invention for solving the aforementioned problem is a control method for the camera comprising a plurality of functions performing elements for performing various functions, and first and second control units; wherein, if the camera is placed in the usable mode, the first control unit, in order to perform the function specified by the operator, instructs the second control unit to control the operation of at least one of the function performing elements, whereas the second control unit controls the operation of the function performing element in response to this instruction. This control method is further characterized in that, when the electronic equipment has been switched from the disable to usable mode, the first control unit performs initializing operation, whereas the second control unit is capable of controlling the operation of at least one of the function performing elements that that changes the appearance of the camera, without receiving instruction from the first control unit.

The aforementioned control of the operation of the element that changes the appearance of the camera is preferred to be control of a lens barrel coming out of the collapsed position.

The aforementioned control of the operation of the element that changes the appearance of the camera is preferred to be control of a stroboscope coming out of the collapsed position.

A still further invention for solving the aforementioned problem is electronic equipment comprising a plurality of function performing elements for performing various functions, and first and second control units; wherein the first control unit, in order to perform the function specified by the operator, instructs the second control unit to control the operation of at least one of the function performing elements, whereas the second control unit controls the operation of the function performing element in response to this instruction; and the second control unit monitors an operation error of the function performing elements in response to the instruction from the first control unit; this electronic equipment being further characterized in that, when the electronic equipment is in a specific condition, the second control unit performs the monitoring operation without receiving the instruction from the first control unit.

It is preferred that the first control unit should process errors according to the result of monitoring by the second control unit B.

It is preferred that the aforementioned specific condition should be the condition during the time from the start of initializing operation by the first control unit to the completion of the predetermined setting operation.

The electronic equipment is preferred to be a camera.

In electronic equipment and camera where the first control unit of higher processing speed controls the second control unit of lower processing speed in the usable mode, the first control unit is disabled to reduce power consumption when not in service. In the meantime, when the power is turned on to go into the usable mode, the operation of a specific function performing element (actuator) is controlled by the second control unit prior to completion of the activation of the first control unit. This arrangement allows the electronic equipment and camera to go into the usable mode immediately, thereby reducing the processing time for going into the usable mode. Further, this also allows the operator to recognize that the power is on since the appearance of the electronic equipment and camera is changed immediately after power is turned on, whereby the operator can use the electronic equipment and camera comfortably without being placed under mental stress.

In the case of a camera or the like, the lens barrel is protruded and the appearance is changed even prior to completion of the activation of the first control unit. This arrangement allows the user to make preparation for shooting, for example, by directing the camera toward a subject. Thus, the first control unit completes activation to go into the usable mode while preparation is being made. The user can reduce the time from turning on of the power to actual use of the equipment.

Further, when the equipment shifts from the enable to unusable mode, and the second control unit drives the function performing elements in such a way that the external appearance of the electronic equipment and camera is changed, then there is no need for reporting that the start switch has been turned on by light or sound. This arrangement provides the electronic equipment and camera that characterized by compact configuration and light weight, without the need of installing a light emitting element or speaker.

In the present invention, the "unusable mode is defined as the mode where the equipment is unable to perform the functions required by the operator, and the operator cannot use the equipment. To put it more specifically, it refers to the mode where all functions are completely stopped and power consumption is reduced to zero, or the low power consumption mode where the equipment is supplied with only the power needed to maintain the required minimum functions. It should be noted, however, that power consumption is not completely reduced to zero in the case of the "electronic equipment" or "camera" in the "unusable mode" since at least power is consumed to monitor if the main switch is on or off.

In the present invention, "usable mode" is defined as the mode where the equipment is capable of performing the function required by the operator, and the operator can use the equipment. To put it more specifically, it refers to the state where the equipment is consuming the power to perform the functions required by the operator. In the present invention, the "function" is defined as the role that can be played by one or more of the elements constituting the equipment, either independently or in cooperation with each other. In the present invention, the "start switch" is defined as a switch that is used to switch from the "unusable mode" to "usable mode". It refers to the main switch (power switch) in the following description, but is not restricted thereto. For example, a release switch or reproduction switch is included in the category of the "start switch" when used to change the mode from "unusable mode" to "usable mode".

In the present invention, the "function performing elements" refer to the components of the equipment that are used to achieve the "function". Further, in the present invention the "function switch" is defined as a switch used by the operator to give instruction to the equipment so that the "function" is performed.

In the present invention the "function performing elements associated with functions" are defined as the "function performing elements" that are actuated when performing the function specified by the operator operating the "function switch".

DETAILED DESCRIPTION OF THE PREFERRED EMBODIMENT

Figure 1:
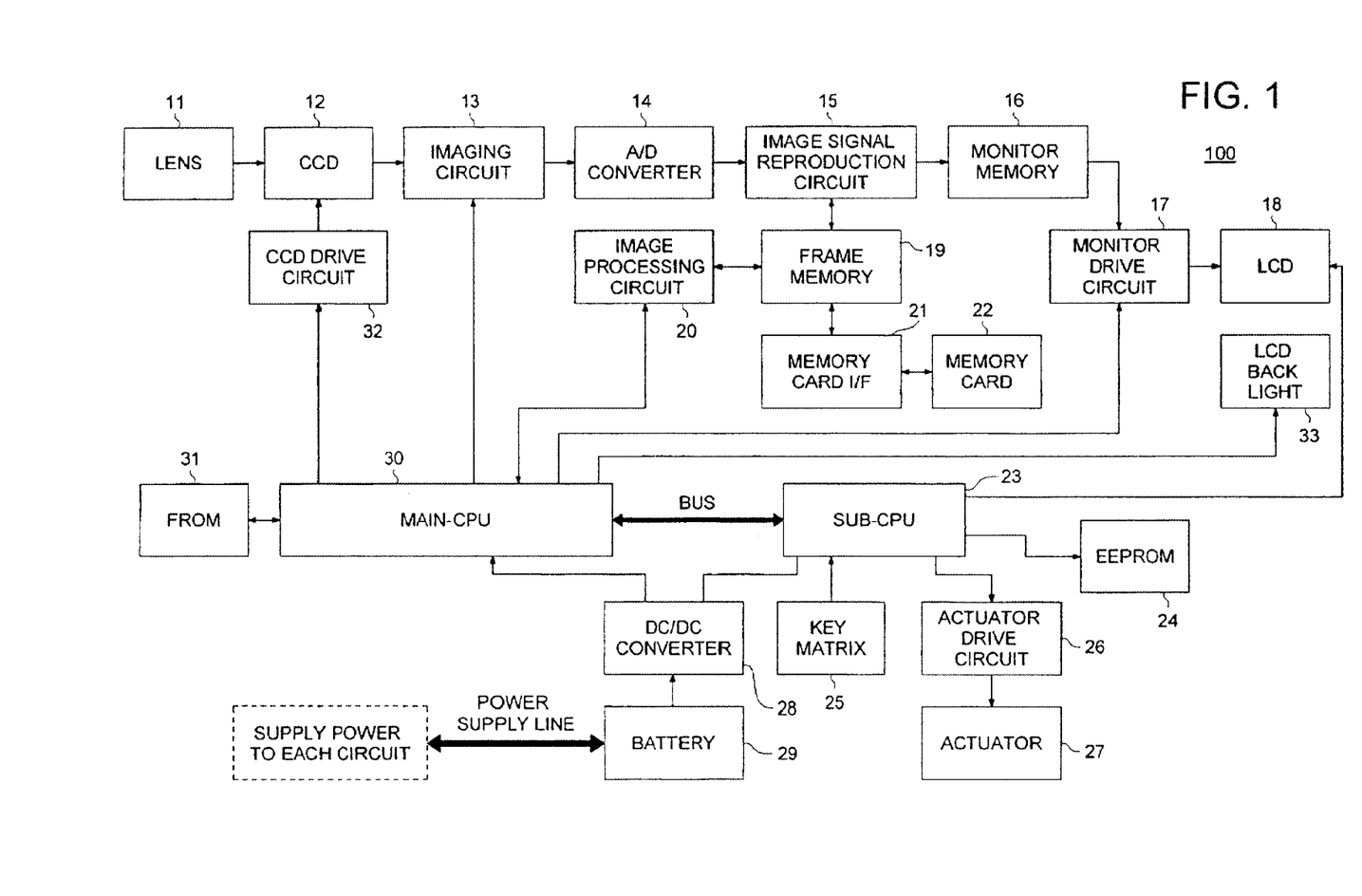
FIG. 1 is a block diagram representing the internal configuration of a digital camera according to the present invention.
Figure 2:
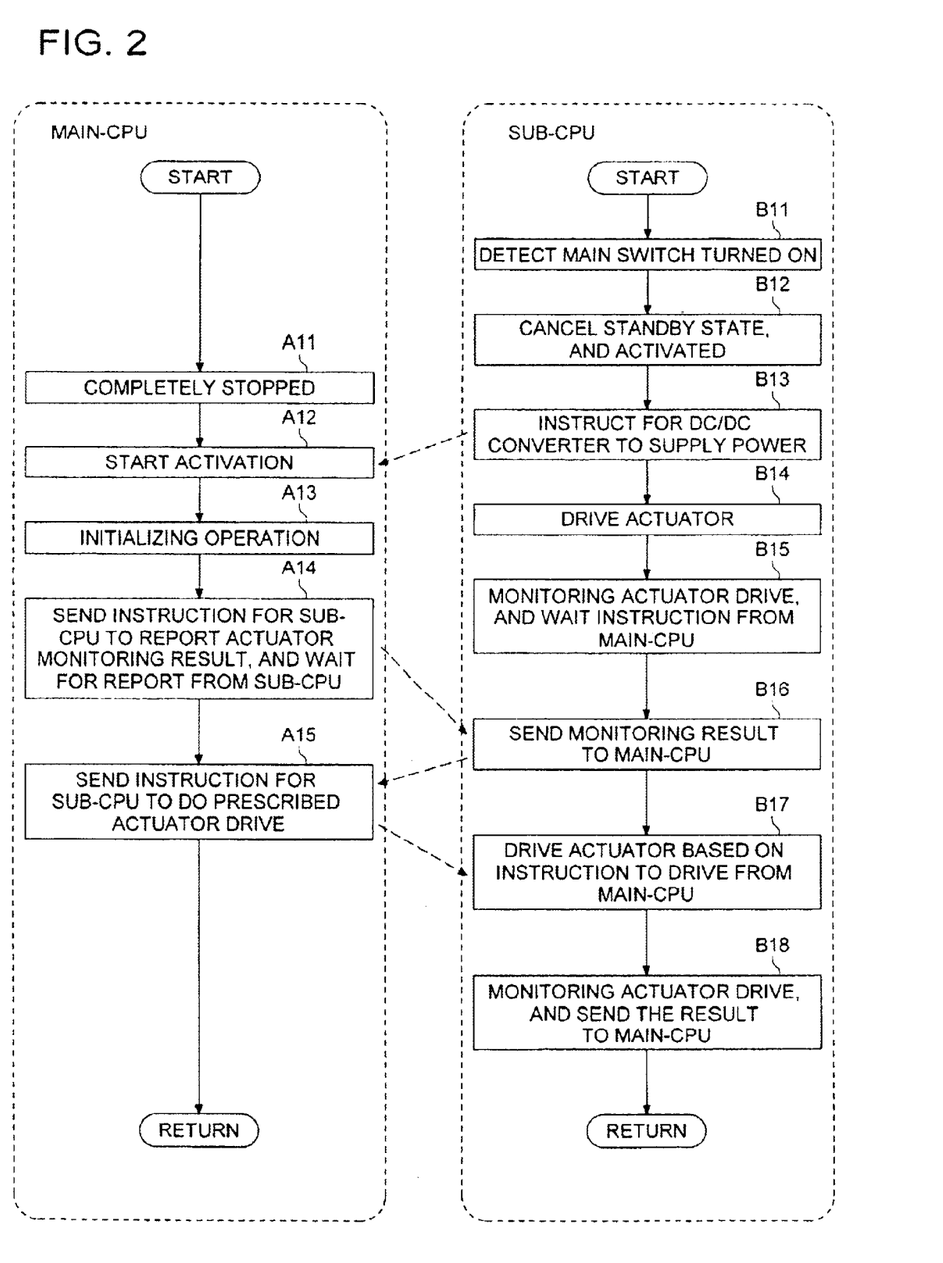
FIG. 2 is a flow chart describing the activation processing performed by the main CPU and sub-CPU of a digital camera according to the present invention.

Referring to FIGS. 1 and 2, the following gives a detailed description of an example of a digital camera as an embodiment of the present invention:

In the following description, the camera is said to be in the "unusable mode" or in the "off mode" when the digital camera power is turned off. It is said to be in the "usable mode" or "on mode" if the power is turned on.

The CPU (central processor unit is said to be in the "unusable mode" or in the "off mode" when no power at all is supplied to the CPU or when the CPU is placed in the low power consumption mode such as a standby mode or sleep mode for supplying power just enough to maintain the required minimum functions. Especially when the system is waiting for some flag or signal in the unusable mode", the CPU is said to be in the "wait mode" or "standby mode". The CPU is said to be in the "usable mode" or "on mode" when it is in the mode other than the aforementioned mode; namely when it is supplied with power necessary to perform the normally intended functions.

With reference to FIG. 1, the following describes the configuration of the digital camera 100 according to the present invention: FIG. 1 is a block diagram representing the internal configuration of the digital camera 100 according to the present invention.

As shown in FIG. 1, the digital camera 100 comprises a lens 11, CCD (Charge Coupled Device) 12, image pickup circuit 13, A/D converter 14, image signal reproduction circuit 15, monitor memory 16, monitor drive circuit 17, LCD (Liquid Crystal Display) 18, frame memory 19, image processing circuit 20, memory card interface 21, sub-CPU 23, EEPROM (Electrically Erasable Programmable Programming ROM) 24, key matrix 25, actuator drive circuit 26, actuator 27, DC/DC converter 28, battery 29, main CPU 30, FROM (Flash ROM) 31, CCD drive circuit 32, LCD backlight 33 and other related parts. Especially the digital camera 100 is driven by two CPUs, main CPU 30 and sub-CPU 23 having different processing speeds. The main CPU 30 and sub-CPU 23 are connected by an intercommunication system bus. The memory card interface 21 is removably provided with a memory card that can be freely mounted or dismounted from the digital camera 100.

The lens 11 forms the optical image of a subject, and the CCD 12 converts into an analog image signal the optical image signal formed on the light receiving surface by the lens 11.

The image pickup circuit 13 provides AGC and clamp processing to the analog image signal sent from the CCD 12, and the result is sent to the A/D converter 14. The A/D converter 14 converts into the digital image signal the analog image signal sent from the mage pickup circuit 13.

The image signal reproduction circuit 15 provides white balancing and related processing to the digital image signal input from the A/D converter 14, and stores temporarily into the monitor memory 16 and frame memory 19 the digital image subjected to this processing.

The monitor memory 16 sends the temporarily stored digital image signals sequentially to the monitor drive circuit 17, which drives the LCD 18 to display the digital image signal sent from the monitor memory 16. The contents of the LCD 18 are shown by the LCD backlight 33.

When the digital image signal displayed by the LCD 18 is sent to the image signal reproduction circuit 15 through the monitor drive circuit 17 after passing through the lens 11 to the A/D converter 14, the image of the subject during the process of photographing is displayed on the LCD 18 by the digital image signal. In this case, the LCD 18 serves as an electronic finder. Further, when the digital image signal displayed by the LCD 18 has been transferred through the image signal reproduction circuit 15 and monitor drive circuit 17 after passing through the image processing circuit 20 and frame memory 19, a photographed image recorded on the memory card 22 is displayed on the LCD 18 by the digital image signal. In other words, the LCD 18 works as a monitor for photographed images at this time.

The frame memory 19 transfers the aforementioned temporarily stored digital image signals sequentially to the image processing circuit 20. The image processing circuit 20 provides compression and decompression to the digital image signal sent from the frame memory 19, and performs processing of memory access and others.

When the digital image signal transferred from the frame memory 19 is transferred to the image signal reproduction circuit 15 and monitor memory 16 after passing through lens 11 to the A/D converter 14, the image processing circuit 20 compresses the digital image signal according to the JPEC (Joint Photographic Experts Group) and transfers this compressed digital image signal again to the frame memory 19. Then the frame memory 19 records this compressed digital image signal on the memory card 22 through the memory card interface 21.

When the digital image signal sent from the frame memory 19 is transferred through the memory card 22, memory card interface 21 and frame memory 19, the image processing circuit 20 decompresses this digital image signal according to the JPEC method or the like, and sends the decompressed digital image signal again to the frame memory 19. Then the frame memory 19 outputs the decompressed digital image signal to the image signal reproduction circuit 15. Further, the decompresses digital image signal having been output to the image signal reproduction circuit 15 is displayed on the LCD 18 as a photographed image through the monitor memory 16 and monitor drive circuit 17. It should be noted, however, that the image compression/decompression method according to the present invention may be replaced by another appropriate compression/decompression method.

The EEPROM 24 comprises a program storage area for storing various programs to be executed by the sub-CPU 23, and a data storage area for storing various data required for execution of the program (both not illustrated). These programs include the program for activation processing shown in the flow chart of FIG. 2.

The key matrix 25 comprises a main switch, various function switches such as release switch and zoom switch to be operated by the operator using a camera to take a picture, and setting keys for setting various modes and dates. The release switch, when pressed halfway, sends the instruction to the sub-CPU 23 to perform auto-focusing. When fully pressed, the release switch sends an instruction to the sub-CPU 23 to start photographing.

In response to the instruction from the sub-CPU 23, actuator drive circuit 26 drives the actuator 27. For example, the actuator drive circuit 26 drives the actuator 27 to move the barrel of the lens 11, to pop up the stroboscopic light emitting unit (not illustrated) and to open/close the lens barrier (not illustrated) of the lens 11.

The DC/DC converter 28 is connected to the battery 29, and turns on or off the power supplied to the main CPU 30 in response to the instruction from the sub-CPU 23. The battery 29 supplies power to all circuits of the digital camera 100 shown in FIG. 1.

The FROM 31 stores in advance various control programs to be executed by the main CPU 30 and various types of data required for execution of the program.

The CCD drive circuit 32 controls the number of pulses for discarding electrical charge for the CCD 12, and adjust the exposure time. Further, the LCD backlight 33 illuminates the LCD 18 and shows the contents displayed on the LCD 18.

The main CPU 30 and sub-CPU 23 are central processor units that cooperate with each other to control various functions of the digital camera 100. The main CPU 30 constitutes the first control unit described in the Claims of the present invention and provides various type of control according to the program stored in the FROM 31. The sub-CPU 23 constitutes the second control unit described in the Claims of the present invention and provides various type of control according to the program stored in the EEPROM 24.

Further, the sub-CPU is responsible for the function of a mode monitor in the present embodiment. If the main switch on/off state can be monitored when the main switch is off (i.e. the camera in the unusable mode), the main CPU 30 may take responsibility for the control of the function of the mode monitor. It is also good practice to add a third CPU, which takes responsibility for the control of the function of the mode monitor.

In the present embodiment, the main CPU 30 has a higher processing speed than that of the sub-CPU 23, and hence requires greater power consumption than the sub-CPU 23.

If the digital camera 100 is in the usable mode allowing photographic operation when the main switch is on, the main CPU 30 performs computation for image processing carried out in the image processing circuit 20, and administers the circuits of the digital camera 100 in a comprehensive manner.

The main CPU 30 issues an instruction to the sub-CPU 23 to drive the actuator 27.

Here the actuator 27 constitutes a function performing elements described in the Claims of the present invention. The actuator 27 is exemplified by a lens 11 feed mechanism for focus adjustment, a lens 11 feed mechanism for scaling, a barrel feeding mechanism for feeding out the lens barrel for holding the lens 11 and collapsing the lens 11, a barrier open/close mechanism for opening or closing the lens barrier for protecting lens 11, a stroboscopic light emitting mechanism for causing the stroboscopic light emitting unit to emit light, a pop-up mechanism for feeding out (popping up) and collapsing of the stroboscopic light emitting unit, a display mechanism for displaying an image on the LCD 18, a speaker mechanism for producing the audio data, and many others. When the operator has operated the main switch or the function switch (e.g. scaling switch) for performing a desired function (e.g. a scaling function), one of the multiple actuators 27 associated with this function switch operates independently or jointly other actuators, whereby various functions built in the camera can be performed.

In the present embodiment, when the main switch is turned off and the digital camera 100 is placed in the unusable mode, power supply from the DC/DC converter 28 to the main CPU 30 will be turned off, and the main CPU 30 is completely stopped without consuming any power. However, the present invention is not restricted thereto. The camera can be placed in the low power consumption mode where the camera is supplied with only the power needed to maintain the required minimum functions.

When the operator has turned on the main switch, the main CPU 30 in the completely stopped state is activated by the power supplied from the DC/DC converter 28, as shown in the flow chart given in FIG. 2 to be discussed later. System initializing operation is performed in the first place. Initializing operation includes such operations as boot loading (selection of read memory), checking of the presence or absence of the memory card, error checking, detection of the capacity and remaining capacity, initialization of the LCD 18 and CCD drive circuit 32 (waiting for circuit stabilization) and initialization of the image processing circuit 20.

When the main switch is turned on and the digital camera 100 is placed in the usable mode where photographing is possible, the sub-CPU 23 gives an instruction to the actuator drive circuit 26 to drive the actuator 27 in response to the aforementioned instruction from the main CPU 30, whereby the drive of the actuator 27 is placed under control.

If the operator has operated the function switch (e.g. scaling switch) wishing to take a picture in the scaling mode, the main CPU 30 sends an instruction to the sub-CPU 23 to drive the actuator 27 related to scaling function. In response to this instruction, the sub-CPU 23 controls the operation of the actuator drive circuit 26 in an attempt to drive the actuator 27 related to the scaling function, thereby allowing the lens 11 for scaling operation to move.

Further, the sub-CPU 23 serves as a mode monitor for monitoring the mode of the main switch independently of whether the main switch is on or off. In other words, the sub-CPU 23 is configured in such a way that not less than a prescribed amount of power is always supplied thereto, and the state of the main switch is monitored at specified intervals.

When the mode monitor has recognized that the switch set to the on position is turned off, a termination flag (termination signal) is set to turn off the power of the digital camera 100 and to select the unusable mode.

When the termination flag (termination signal) is set, the sub-CPU 23 sends a termination signal to the main CPU 30. Upon receipt of the termination signal, the main CPU sends an instruction to the sub-CPU 23 to start various processing required for termination of the camera use, for example, processing for collapsing the barrel of the lens 11, or saves the data in the camera at the time of termination. When such processing has been completed, the sub-CPU 23 gives an instruction to the DC/DC converter 28 to stop power supply to the main CPU 30. This arrangement completely turns off all the circuit shown in FIG. 1 except for the sub-CPU 23 itself, with the result that the power consumption in the circuits including the main CPU 30 is reduced to zero. Further, the sub-CPU 23 itself is placed in the standby mode (wait mode) where the clock cycle is slow, thereby checking if the main switch is turned on or not.

The sub-CPU 23 contains a timer function to manage the year/month/date data, and displays this data on the LCD 18. In response to the instruction given by operating the setting keys on the key matrix 25.

With reference to FIG. 2, the following describes the procedure to be followed when the main switch on-state has been detected by the sub-CPU 23 (mode monitor section) in the standby mode:

FIG. 2 is a flow chart describing the activation processing performed by the main CPU and sub-CPU of a digital camera 100. Here processing in steps A11 through A15 is carried out by the main CPU 30, and that in steps B11 through B18 is by the sub-CPU 23.

The sub-CPU 23 placed in the standby mode by the main switch having been turned off sets the flag (activation signal) to start activation as a camera when the mode monitor thereof has detected that the main switch in the off-state is turned on (step B11). Setting of this flag causes the clock cycle of the sub-CPU 23 itself to be set back to the cycle in the camera usable mode (step B12). It sends an instruction to the DC/DC converter 28 (to release the main CPU 30 (step B13). In response to this instruction, power is supplied to the main CPU 30 from the battery 29, whereby the activation of the main CPU 30 is started (step A12).

The main CPU 30 starts the predetermined initializing operation (step A13). Here the sub-CPU 23, after sending the release instruction of the step B13, without waiting for the termination of the initializing operation by the main CPU 30, gives an instruction to the actuator drive circuit 26 to drive the actuator 27 (step B14).

In other words, when the main switch has been turned on, a predetermined specific one of multiple actuators 27 mounted on the camera 100 is controlled to drive.

Which of multiple actuators 27 mounted on the camera 100 should be driven at the time of activation can be determined as appropriate. If the appearance of the camera is changed by the drive of the actuator 27, the operator is quickly informed that the main switch has been turned on, so this arrangement is preferred.

For example, the sub-CPU 23 gives an instruction to the actuator drive circuit 26 to perform such control that the lens barrel (not illustrated) of the lens 11 collapsed in to the collapse position inside the camera 100 when the power is turned off should be protruded to the photographic position (wide position if the lens 11 is a zoom lens) where photographing is enabled when the power is turned on again. In the camera where the lens barrel is collapsed when the camera is out of service, since this protruding operation is an essential task before photographing starts, it is particularly important to perform this protruding control when the camera is activated.

Further, for example, when the camera 100 has a lens barrier (not illustrated) that can be freely opened or closed by the motor drive, it is good practice to perform control in such a way that the lens barrier is opened when power is on.

In the case of a camera where the stroboscopic light emitting unit (not illustrated) is collapsed in the predetermined position inside the camera when power is off, and pops out to be fed out to the light emitting position when power is on, it is also good practice to perform control in such a way that the stroboscopic light emitting unit pops up from the predetermined position to the light emitting position when power is on.

As described above, in the present embodiment, the sub-CPU 23 controls the drive of the actuator 27 without getting any instruction from the main CPU 30, when the main switch is turned on. Thus, the sub-CPU 23 is capable of controlling the drive of a specific actuator 27 in parallel with initializing operation of the main CPU 30.

After the drive of the specific actuator 27 has terminated, the sub-CPU 23 checks if the specific actuator has correctly been driven or not. While monitoring for operation error, the sub-CPU 23 goes into the mode of waiting for the instruction from the main CPU 30 (step B15).

Various techniques have been proposed to monitor for an operation error (e.g. Japanese Application Patent Laid-Open Publication No. Sho 62-175721 and Japanese Application Patent Laid-Open Publication No. Hei 01-239538). These techniques can be used as appropriate, so their detailed explanation will be omitted. The following gives an example of error monitoring in the lens barrel protruding mechanism used in the present embodiment. The present embodiment is provided with a photo-interrupter (pulse generating means) for generating the pulses in response to the rotation of the drive motor used to protrude the lens barrel and a counter (counting means) for counting the pulses, as disclosed in the Japanese Application Patent Laid-Open Publication No. Hei 06-313834. It is also provided with error detecting means that determines that an error has occurred if the predetermined number of pulses cannot be detected after the lapse of a predetermined time since the time of starting the protruding of the lens barrel when the pulses are counted by this counter.

Upon termination of the initializing operation in step A13, the main CPU 30 sends an instruction to the sub-CPU 23 to report the result of monitoring the operation error, in order to check if the actuator 27 has an operation error or not (step A14).

As can be understood, in the prior art (see FIG. 3), the main CPU gives an instruction to the sub-CPU to drive each actuator after having started up completely subsequent to termination of initializing operation. After that, the main CPU of the prior art waits for the report of the result of error monitoring fed from the main CPU (steps A24 and A25). In the present embodiment, however, the system is so arranged that the sub-CPU 23 has already been started to drive each actuator, and waits for the termination of the initializing operation of the main CPU 30 while monitoring the error thereof. So the main CPU 30 is required to notify the sub-CPU 23 that the initializing operation has been terminated and the system is ready to receive the report on the result of error monitoring.

Having received this instruction, the sub-CPU 23 sends the result of monitoring the faulty operation to the main CPU 30 (step B16), and control is provided by the main CPU 30 based on the result of monitoring.

When there is an operation error to the aforementioned specific actuator, the main CPU 30, in order to release the error, issues an instruction to the sub-CPU 23 to display the error on the display unit (step A15). Upon receipt of this instruction, the sub-CPU allows the error to be indicated on the display unit (step B17), and other predetermined error processing is performed.

If there is no operation error in the drive of the specific actuator, the camera is ready for photographing. So based on the instruction given by the operator operating the key, the main CPU 30 instructs the sub-CPU 23 to drive the required actuator 27 (e.g. scaling drive mechanism in the case of scaling operation) (step A15). In response to this instruction, the sub-CPU 23 provides control to drive the actuator 27 (step B17).

The sub-CPU 23 monitors the operation error of the actuator 27 to be driven in this case as well. Unlike the case of step B15, the result of this monitoring is sent to the main CPU 30 without waiting for the report from the main CPU 30 (Step B18).

While the camera 100 is ready for photographing, processing in step A15 by the main CPU 30 and in steps B17 and B18 is repeated.

As described above, the digital camera 100 in the present embodiment is operated by the main CPU 30 and sub-CPU 23 having processing speeds different from each other.

When the digital camera 100 is off, i.e. when the main switch of the key matrix 25 is off (power off), the sub-CPU 23 having a lower processing speed gives an instruction to the DC/DC converter 28 to stop power supply to the main CPU 30, and at the same time, the sub-CPU 23 itself is changed into standby mode to monitor if the main switch of the key matrix 25 is turned on (power on) or not. If the main switch is turned on, the sub-CPU 23 releases its own standby mode and is activated, and gives an instruction to start supply of power to the main CPU 30; then the main CPU 30 is activated. After that, in parallel with the initialization operated of the main CPU 30 during activation processing, the sub-CPU 23 controls the drive of the actuator 27, e.g. by protruding the barrel of the lens 11 and opening the lens barrier. When the digital camera 100 is on, the sub-CPU 23 drives the actuator 27 through the actuator drive circuit 26 based on the instruction of the main CPU 30.

In the meantime, the main CPU 30 having a higher processing speed administers the circuits of the digital camera 100 in an comprehensive manner when the digital camera 100 is on. Especially in this case, the main CPU 30 gives an instruction to the sub-CPU 23 to drive the actuator 27. Further, when the digital camera 100 is off, the main CPU 30 is completely deactivated (power consumption reduced to zero).

When the digital camera 100 according to the present embodiment has been turned on and is going into the photographing mode, the sub-CPU 23 drives the actuator 27 by protruding the barrel of the lens 11 or opening of the lens barrier, during the initialization of main CPU 30 in the process of activation. This arrangement allows the digital camera 100 to go quickly into the photographing mode, thereby cutting the processing time for reaching the photographing state. Immediately after power is turned on, this arrangement allows the operator to recognize that the digital camera 100 is ready for photographing, whereby the operator can use the digital camera 100 comfortably without being placed under mental stress.

When the digital camera 100 is turned on to shift to the photographing mode, the sub-CPU 23 protrudes the barrel of the lens 11 or opens the lens barrier during the initialization of the main CPU 30 in the process of activation. This arrangement allows the operator to direct the camera toward the subject of the digital camera 100 and to make various preparations for photographing in a shorter period of time. During the preparation made by the operator, the initialization of the main CPU 30 is carried out and the digital camera 100 shifts to the photographing mode. So upon completion of preparations, the operator can take a picture immediately, with the result that time between turning on of the power and photographing is reduced.

As power is turned on, the barrel of the lens 11 is fed out and the lens barrier is opened. This arrangement eliminates the need of informing the operator by light or sound that the power has been turned on, and hence removes the need of installing a light emitting element or noise disseminating speaker. This arrangement provides a compact and lightweight digital camera 100 characterized by superb portability.

It should be noted that the description of the present embodiment refers to an example of electronic equipment and camera according to the present invention and control method thereof, but not restricted thereto. The detailed configuration and operation of the digital camera 100 according to the present invention are open to appropriate modification, without departing from the spirit of the present invention.

A digital camera 100 has been used as an example to explain electronic equipment of the present invention. However, the present invention is not restricted thereto. The present invention is applicable to any such apparatus with multiple CPUs, including a portable player-recorder such as MD, PDA and many others.

In the present embodiment, the main CPU 30 in the unusable mode (off state) is deactivated completely (power consumption reduced to zero). Is also possible to adopt a low power consumption mode (low clock cycle) such as standby mode or sleep mode in the off state.

(Effects of the Invention)

According to the present invention, when electronic equipment or a camera in the disable state has been activated to shift into the usable mode, driving of a specific function performing element is processed immediately. This arrangement allows the electronic equipment or camera to go into the usable mode quickly. This reduces the time required to reach the usable mode. Further, immediately after activation has started, the operator can recognize that the system is enabled. This, in turn, permits the operator to use the camera comfortably without being placed under mental stress.

Further, drive of a specific function performing element is processed immediately after activation has started, so that the operator can recognize that the equipment is enabled and make preparation for using the electronic equipment or camera (directing the camera toward the subject in the case of a camera, etc.) immediately. During this preparation work by the operator, the initialization operation of the control unit terminates and the electronic equipment or camera goes into the usable mode. The operator can use the electronic equipment or camera immediately after having completed preparation for use, thereby reducing the time from the start of activation to arrival to of the usable mode (photographing).

Thus, application of the present invention to a camera solves the problem of missing a chance of taking a desired picture due to a long required time for preparation for use because of slow activation of the camera.

Further, if drive of the function performing elements that change the external appearance of the equipment is processed after activation has started, there is no need of using light and sound to notify the operator that the mode has changed into the usable mode. This arrangement eliminates the need of installing a light emitting element or noise disseminating speaker, and can provide a more compact and lightweight electronic equipment or camera characterized by superb portability.

What is claimed is:

1. An electronic equipment controlled by a first control unit and a second control unit, comprising:
    a start switch for switching between an unusable mode and a usable mode of the electronic equipment;
    a mode monitor for monitoring the start switch to identify a mode of the electronic equipment, and outputting an activation signal at least when the electronic equipment has been switched from the unusable mode to the usable mode;
    a plurality of function performing elements for performing various functions of the electronic equipment; and
    a function switch for operating a function performing element of the plurality of function performing elements, wherein;
        (1) when the mode monitor has identified that the electronic equipment is placed in the usable mode; if the function switch has been operated, the first control unit issues an instruction to the second control unit to perform a function associated with the function switch, and in response to the instruction, the second control unit performs an operation control of the function performing element associated with the function;
        (2) when the mode monitor has identified that the electronic equipment is placed in the unusable mode, the first control unit is set to the unusable mode and the second control unit is set to the standby mode with respect to the activation signal; and
        (3) when the mode monitor has recognized that the electronic equipment has been switched from the unusable mode to the usable mode, the mode monitor outputs the activation signal to the second control unit, and the second control unit, after releasing an unusable mode of the first control unit, performs an operation control of a specific function performing element of the plurality of function performing elements without receiving an instruction from the first control unit.

2. The electronic equipment of claim 1, wherein the second control unit and the mode monitor are controlled by one CPU.

3. The electronic equipment of claim 1, wherein the first control unit start initializing operation after the unusable mode of the first control unit having been released.

4. The electronic equipment of claim 3, wherein the initializing operation is performed in parallel to the operation control of the specific function performing element by the second control unit.

5. The electronic equipment of claim 1, wherein power consumption of the first control unit is greater than power consumption of the second control unit.

6. The electronic equipment of claim 1, wherein a processing speed of the first control unit is higher than a processing speed of the second control unit.

7. The electronic equipment of claim 1, wherein when the function switch has been operated, the first control unit specifies a function performing element for performing the function associated with the function switch, and instruct the second control unit to control the operation of the specified function performing element.

8. The electronic equipment of claim 1, wherein the electronic equipment is a camera.

9. An electronic equipment, comprising:
    a plurality of function performing elements for performing various functions;
    a first control unit; and
    a second control unit; wherein the first control unit, in order to perform a function specified by an operator, issues an instruction to the second control unit to perform a control operation of at least one of the plurality of function performing elements, and the second control unit performs the control operation of the plurality of function performing elements in response to the instruction;
    wherein, when the electronic equipment is placed in a specific condition, the second control unit is capable of performing a control operation of a specific function performing element of the plurality of function performing elements, without an instruction from the first control unit.

10. The electronic equipment of claim 9, wherein the specific condition is the condition during the time from the start of a predetermined initializing operation by the first control unit to the completion of the predetermined initializing operation.

11. The electronic equipment of claim 9, wherein the electronic equipment is a camera.

12. A camera, comprising:
    a plurality of function performing elements for performing various functions;
    a first control unit; and
    a second control unit; wherein the first control unit, in order to perform a function specified by the operator, issues an instruction to the second control unit to perform a control operation of at least one of the plurality of function performing elements, and the second control unit performs the control operation of the plurality of function performing elements in response to the instruction; wherein, when a start switch of the camera has been changed from an unusable mode to a usable mode, while the first control unit performs an initializing operation, the second control unit performs an operation control of at least one of the plurality of function performing elements that changes an appearance of the camera, without any instruction from the first control unit.

13. The camera of claim 12, wherein the operation control of at least one of the plurality of function performing elements that changes an appearance of the camera is an operation control of protruding a lens barrel out of a collapsed position.

14. The camera of claim 12, wherein the operation control of at least one of the plurality of function performing elements that changes an appearance of the camera is an operation control of protruding a stroboscope out of a collapsed position.

15. A control method for an electronic equipment provided with a plurality of function performing elements for performing various functions, a first control unit and a second control unit, comprising:
    making the first control unit issue an instruction to the second control unit to perform a control operation of at least one of the plurality of function performing elements, in order to perform a function specified by an operator, when the electronic equipment is placed in a usable mode;
    making the second control unit perform the control operation of the plurality of function performing elements in response to the instruction;
        wherein, when the electronic equipment has been switched from an unusable mode to a usable mode, the second control unit, after releasing an unusable mode of the first control unit, performs an operation control of a specific function performing element of the plurality of function performing elements without receiving an instruction from the first control unit.

16. The control method for an electronic equipment of claim 15, wherein an initializing operation by the first control unit is performed in parallel to the operation control of the specific function performing element by the second control unit.

17. A control method for a camera provided with a plurality of function performing elements for performing various functions, a first control unit and a second control unit, comprising:

making the first control unit issue an instruction to the second control unit to perform a control operation of at least one of the plurality of function performing elements, in order to perform a function specified by an operator, when the camera is placed in a usable mode;

making the second control unit perform the control operation of the plurality of function performing elements in response to the instruction;

wherein, when the camera has been switched from an unusable mode to a usable mode, while the first control unit performs an initializing operation, the second control unit performs an operation control of at least one of the plurality of function performing elements that changes an appearance of the camera, without receiving an instruction from the first control unit.

18. The control method for a camera of claim 17, wherein the operation control of at least one of the plurality of function performing elements that changes an appearance of the camera is an operation control of protruding a lens barrel out of a collapsed position.

19. The control method for a camera of claim 17, wherein the operation control of at least one of the plurality of function performing elements that changes an appearance of the camera is an operation control of protruding a stroboscope out of a collapsed position.

20. An electronic equipment, comprising:

a plurality of function performing elements for performing various functions;

a first control unit; and a second control unit; wherein the first control unit, in order to perform a function specified by an operator, issues an instruction to the second control unit to perform a control operation of at least one of the plurality of function performing elements, the second control unit performs the control operation of the plurality of function performing elements in response to the instruction, and the second control unit monitors an operation error of the plurality of function performing elements in response to the instruction from the first control unit;

wherein, when the electronic equipment is placed in a specific condition, the second control unit is capable of performing a control operation of a specific function performing element of the plurality of function performing elements, without an instruction from the first control unit.

21. The electronic equipment of claim 20, wherein the first control unit performs error processing according to a result of monitoring by the second control unit.

22. The electronic equipment of claim 20, wherein the specific condition is the condition during the time from the start of a predetermined initializing operation by the first control unit to completion of the predetermined initializing operation.

23. The electronic equipment of claim 20, wherein the electronic equipment is a camera.

* * * * *